United States Patent [19]

Li

[11] 4,000,659
[45] Jan. 4, 1977

[54] ZERO STIFFNESS TAUT RIBBON ROTARY SUSPENSION SYSTEMS

[76] Inventor: Yao Tzu Li, Huckleberry Hill, Lincoln, Mass. 01773

[22] Filed: Feb. 25, 1975

[21] Appl. No.: 552,877

[52] U.S. Cl. ................................. 73/514; 74/5 F; 308/2 A
[51] Int. Cl.² ........................................ G01P 15/00
[58] Field of Search ...................... 73/514; 74/5 F; 308/2 A; 267/158, 160

[56] References Cited

UNITED STATES PATENTS

| | | | |
|---|---|---|---|
| 2,759,157 | 8/1956 | Wiancko | 73/514 |
| 3,360,255 | 12/1967 | Ormond | 308/2 A |
| 3,452,608 | 7/1969 | Stiles | 74/5 F |
| 3,546,925 | 12/1970 | Barton | 73/514 |

Primary Examiner—Richard C. Queisser
Assistant Examiner—Anthony V. Ciarlante
Attorney, Agent, or Firm—Kenway & Jenney

[57] ABSTRACT

A taut ribbon rotary suspension system is constructed with ribbons stretched inside a case over a set of ribbon planes intersecting the pivot axis of the suspended member. The ribbons are wrapped over a set of rod segments attached to the suspended member so that the line of departure of the ribbons from the rod coincides with the pivot axis. The ribbons pertaining to each ribbon plane at one side of the pivot axis are rigidly attached to the case to provide positive geometric positioning. The ribbons of the same ribbon plane at the other side of the pivot axis are anchored elastically to minimize effect due to dissimilar coefficient of expansion. Configuration may vary from using single ribbon plane to two orthogonal planes for single axis application and four ribbon planes for two orthogonal axis adaptation.

20 Claims, 27 Drawing Figures

ZERO STIFFNESS TAUT RIBBON ROTARY SUSPENSION SYSTEMS

PRIOR ART

This present invention relates to a class of rotary suspension systems and in particular for instrument application where an output is produced by a small angular deflection about the pivot axis of the suspension system. This small angular deflection can be detected with a suitable sensor. For more precision applications, a torquer may be used to generate a torque about the pivot axis to balance the torque derived from the input of the instrument and thereby to null the sensor output. The electrical signal associated with the torquer is then used as an output.

Conventional rotary suspension systems may be found in the form of jowel bearing, ball bearings, air bearings and magnetic suspension systems. While the first two types cost much less than the last two types, these mechanical bearings do suffer a limitation in the larger uncertainties of the output torque and angle about the pivot axis.

In the present invention, a passive mechanical rotary suspension system is devised. A number of sets of thin ribbons are stretched inside the instrument case and a number of rods are used as the building block to configurate a group of rotary suspension systems. The objective is to achieve lower level of uncertainties than the ball or jowel bearings but at no sacrifice to the low cost features of these simple devices.

Having thus introduced the objectives, the following figures will be used to give a clear illustration of the working principle of my invention in its various forms.

DETAILED DESCRIPTION OF THE INVENTION

Figure 1:
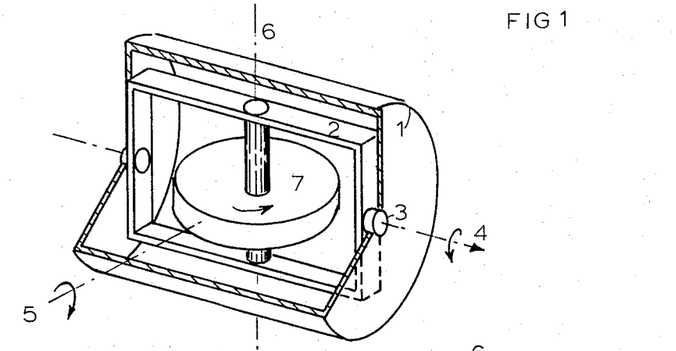
FIG. 1 A single degree of fredom gyroscope with simple pivots as an illustration.

FIG. 1 shows a typical example where a rotary suspension system in the form of a pivot 3 may be used to suspend a single degree of freedom gyro wheel 7 mounted inside a gimble herein referred to as the second member 2. In this case, the input is an angular rate applied to the instrument case along the input axis 5 whereas a reaction torque is provided along the pivot axis 3 and is defined as the output axis 4. The suspended member 2 carrying the gyro wheel 7 is responsible for the input-output relationship.

Figure 2:
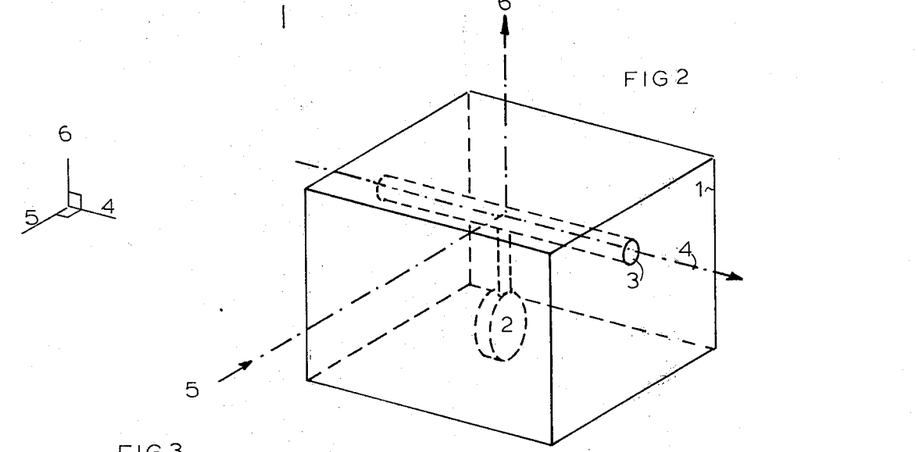
FIG. 2 Pendulous accelerometers with simple pivot as an illustration.

FIG. 2 shows the example of a simple pendulous mass 2 as an acceleration sensor. Here the input is a linear acceleration along the input axis 5 orthogonal to the output axis 4. The seismic mass 2 is mounted in case 1 by the pivot 3. Axis 6 represents the vertical reference of the system.

Figure 3:
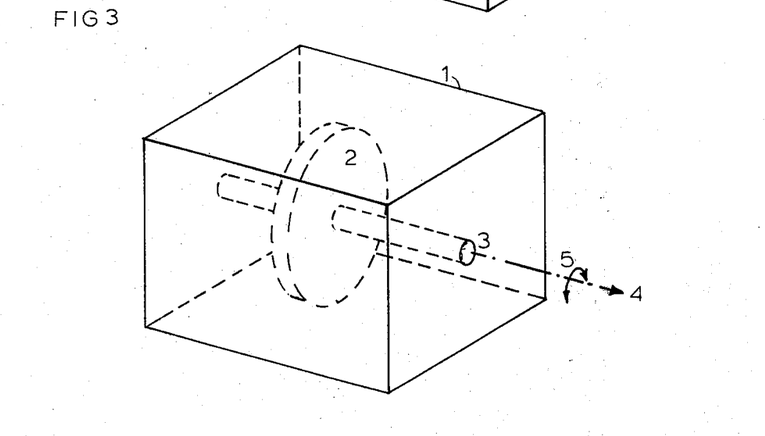
FIG. 3 Angle accelerometer with simple pivot as an illustration.

As a third example, one may use a wheel-shaped mass 2 as an angular accelerometer as shown in FIG. 3. In this case, both the input angular acceleration 5 and the output axis 4 coincide with the pivot axis 3.

Figure 4:
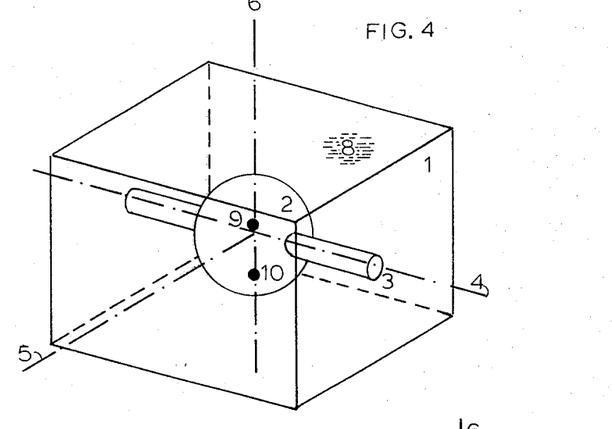
FIG. 4 Floated pendulous accelerometer with simple pivot as an illustration.

As a fourth example, one may have a floated pendulous accelerometer as shown in FIG. 4 in which the mass of the suspended member 2 is floated in the fluid 8 inside the instrument case with a neutral buoyancy 9 displaced from the C.G. (center of gravity) 10 of the floated mass by a short distance. The two centers define the mass axis 6. A structural suspension system represented by pivot 3 provides lateral constraint and specifies the output axis, which is normal to the mass axis. Under ideal conditions, an acceleration applied to the instrument along the input axis 5 would produce a moment about the output axis 4.

Figure 5:
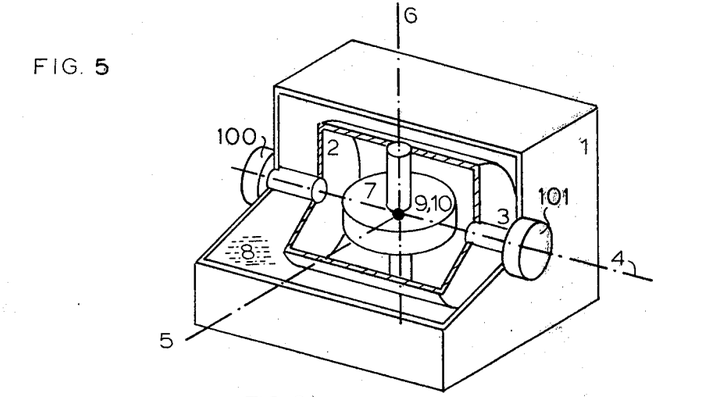
FIG. 5 Floated single degree of freedom gyro with simple pivot as an illustration.

FIG. 5 shows a floated rate gyro. The suspended member 2 carries the gyro wheel 7 and serves as a float submerged in fluid 8 inside case 1. The pivot 3 is used to provide lateral restraint and defines the output axis 4. In this application both C.B. (center of buoyancy) 9 and C.G. 10 coincide with the origin of the coordinate system, defined by axes 4, 5, and 6.

In all these examples, if only the specified input is applied, then the suspension system is a trivial problem. However, in field application, there usually are linear and angular acceleration or forces and torques of various degrees of intensities being applied along axes other than the specific input axis. To overcome these effects, including the ever-present gravitational pull of the earth, we need an effective suspension system. As a general rule, an effective suspension system must resist the disturbances of certain specific magnitudes and minimize their effects upon the desired output signal down to a specified tolerable level. Needless to say, it also should not be itself generate undesirable errors due to other environmental effects, such as temperature and temperature gradiants.

In the present invention, sets of thin ribbons wrapped around rigid bars are used as the building blocks to configurate a group of rotary suspension systems all with low uncertainties along the pivot axis while maintaining high lateral rigidity along other axis. They demonstrated performances adequate for high quality gyros and accelerometers, used with an angular sensor as in convensional open loop instrument or with a sensor and a torquer as in convensional closed loop instrument.

Conventional systems are well known in the art and are illustrated for example in "Control System Components" by Gibson and Tuteur (McGraw-Hill Book Company, 1958) at, for example, page 357. Sensors are shown as element 100 in FIG. 5 and as elements 100' and 100" in FIG. 15. Torquers are shown as element 101 in FIG. 5 and as elements 101' and 101" in FIG. 15.

COPLANAR TAUT RIBBON ROTARY SUSPENSION SYSTEM

Figure 6:
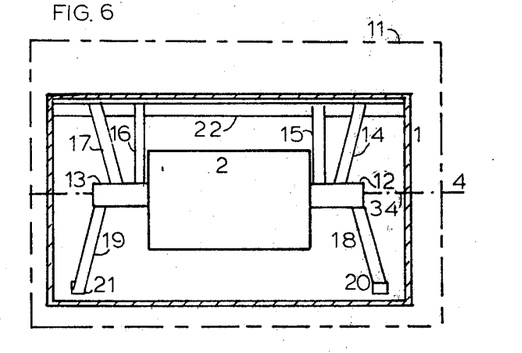
FIG. 6 Taut ribbon coplanar suspension system viewing in a direction normal to the ribbon plane.
Figure 7:
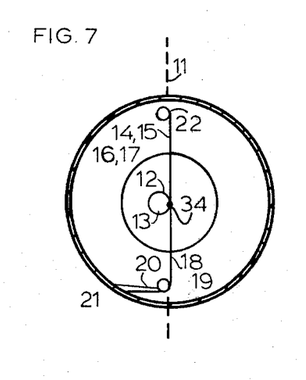
FIG. 7 Same as FIG. 6 viewing along the pivot axis.

The first simple taut ribbon suspension system involves a set of coplanar-ribbon-and-rod structures as shown in FIG. 6 and 7. The instrument case is identified as 1, and the suspended member as 2. Member 2 carries a rod 12 rigidly attached to the right hand end and a rod 13 to the left hand end in parallel to the pivot axis 34 of the member 2 and with the surface of each rod tangent to a ribbon plane 11 containing the pivot axis 34. This ribbon plane 11 is also identified in FIG. 7 which is the end view of FIG. 6. The mass of the said member 2 is to be suspended by ribbons 14, 15, 16, 17, 18 and 19 which are individually wrapped around the said two rods at the inner ends of the ribbons and anchored to the said case 1 at 20, 21 and 22. Ribbons 14, 15, and 18 are placed in a ribbon plane tangent to rod 12 at the pivot axis. Likewise, ribbons 16, 17 and 19 are placed in a ribbon plane tangent to rod 13, also at the pivot axis. For a preferred configuration, the two ribbon planes containing the ribbons at the two ends of the suspended mass should be coplanar as identified as 11 in FIG. 7 to achieve a desired rigidity in said plane.

Since all ribbons are placed in a plane or planes tangent to the rods which are rigidly attached to the suspended member 2 and their lines of tangent coincide with the pivot axis 34 or the output axis 4, it follows that the instantaneous center of rotation of the suspended member with respect to the ribbons would be identical with the specified pivot axis.

Figure 8:
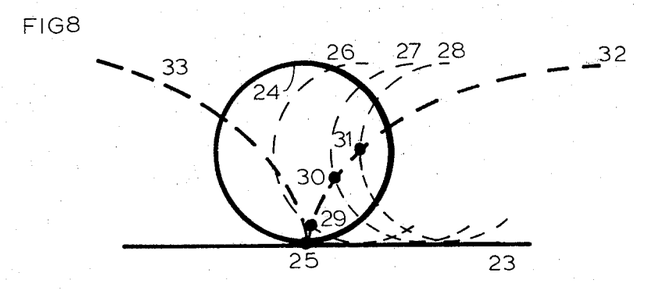
FIG. 8 Locus of the pivot axis fixed on suspended member moving with respect to the case.
Figure 9:
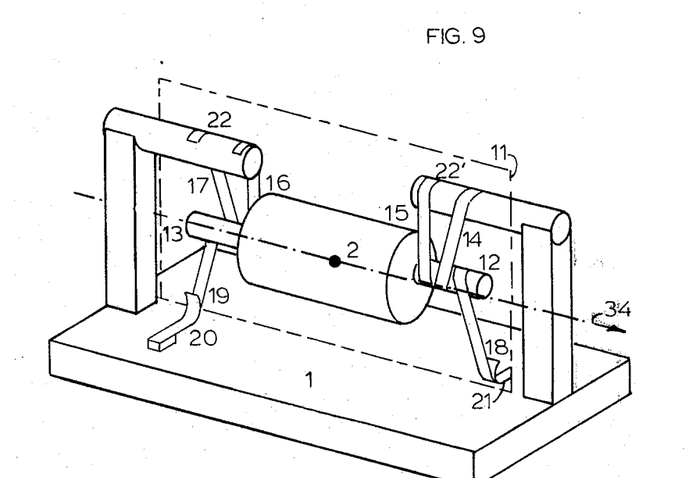
FIG. 9 Configuration with one ribbon plane and two sets of rods on opposite sides of the ribbon plane.

In the configuration of FIG. 7, it might give the illusion that the suspended mass 2 would move up or down together with the rod 12 and 13 as it rotates. Indeed, the center of the rod does make a finite movement in direct proportion to the angle of rotation of the suspended member about the pivot axis 34. But the pivot axis 34, itself being coincident with the instantaneous center of rotation on ribbon plane 11, should have zero derivative of linear motion over the angular displacement with respect to the ribbon plane 11. To gain a better understanding of the property of the instantaneous center of rotation one may consider the analogy of a wheel rotating over a flat surface where the instantaneous center of rotation of the wheel with respect to the surface is at the point of contact between the wheel and the surface where their relative motion is zero instantaneously. The locus of a fixed point on the rim of the wheel 24 with respect to the flat surface 23 is shown in FIG. 8. As the wheel moves over toward the right hand side shifting positions to 26, 27 and 28, the corresponding movement of the fixed point on the rim would move to 29, 30 and 31. Thus the locus may be represented by lines 32 and 33. At the apex 25 of the said locus the motion of the said fixed point with respect to the flat surface is quite small over a significant angle of rotation of the wheel. Based upon the logic of the locus of a fixed point on the rim of a wheel as shown in FIG. 8, there is a similar locus of a fixed point on the suspended member of FIG. 6 and 7 with respect to the ribbon plane 11, and it is desirable to place the pivot axis at the apex of its locus while the suspended member 2 is aligned to its neutral position with respect to the instrument case 1. The small offset of the locus of the pivot axis in a direction normal to the ribbon plane may be undesirable in some application. One possible remedy can be realized by placing the two rods 12 and 13 of the two ends of the suspended member 2 at opposite sides of the ribbon plane 11, as shown in FIG. 9. In this manner, it compensates for the motion of the suspended member at the mid-point between the two rods. But in doing so it would cause the axis of the suspended mass to tilt slightly.

In principle, a ribbon constituting any segment of the ribbon plane has the same relationship with respect to the rod rolling over the ribbon plane 11. For this reason ribbons 14, 15, 16 and 17 are arranged in a truss-like structure as shown in FIG. 9 and thereby to increase the translational rigidity along the pivot axis 34.

In the configuration of FIG. 9, the upper set of ribbons are anchored rigidly to the instrument case over straight edges 22 and 22' parallel to the pivot axis 34 whereas the lower set of ribbons 18 and 19 are stretched by springs 20 and 21 to keep all ribbons in tension and thereby remaining within the ribbon plane under all loading conditions. In the ideal condition the springs used should have low stiffness in the direction of the ribbons to stimulate a constant force pull and yet be rigid in other directions to keep the ribbons in proper orientation.

Generally speaking, a coplanar ribbon suspension system as shown in FIG. 6 or 9 may exhibit a rigidity along any direction in the ribbon plane with a magnitude about the same as the rigidity of a single ribbon under tensile loading. This can be considered as quite high for most applications. On the other hand, the torsional rigidity of the system and the associating uncertainty about the pivot axis can be quite low, since in principle it is possible to make the total effective width of the ribbons on each side of the pivot axis to be the same so that there is no effective change in the potential energy in winding and unwinding these ribbons while the suspended member revolves about the pivot axis. One drawback of this coplanar ribbon suspension system is its relatively low rigidity in the direction normal to the ribbon plane. This rigidity is roughly an order of magnitude lower than that in the ribbon plane. For this reason the application of this type of suspension system is limited to those where the need of high rigidity normal to the ribbon plane is not critical. Possible application of this type of coplanar ribbon suspension system may be found in a floated accelerometer or a floated single degree of freedom gyroscope.

Figure 10:
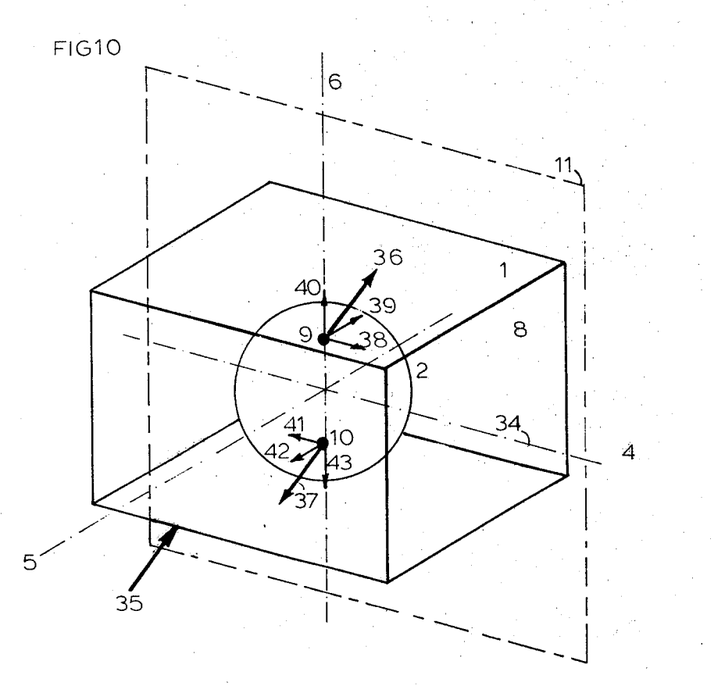
FIG. 10 Vector components of a floated accelerometer with coplanar ribbon suspension system.

FIG. 10 shows the essential features of a floated accelerometer with the pivot axis 34 intersecting the mass axis 6 which is defined by the center of gravity 10 and the center of buoyancy 9 of the suspended member. The pivot axis 34 is guided by a coplanar ribbon suspension system as shown in FIGS. 6, 7 and 9 and is represented by the ribbon plane 11 as marked in FIG. 10. This ribbon plane 11 is defined by the pivot axis 34 and the mass axis 6.

When this system is subjected to a linear acceleration as represented by the vector 35 shown at the lower left corner of FIG. 10, the corresponding reaction generated at the center of gravity 10 would be a force vector 37 in a direction opposite to that of the applied acceleration 35. The corresponding reaction generated at the center of buoyancy 9 would be a force vector 36 equal in magnitude but in the direction of the applied acceleration. By resolving these two force vectors into components along the input axis 5 output axis 4 and the mass axis 6 it follows that the couple of the force components 39 and 42 in the direction of the input axis would be the input to be measured and is to be resisted by the moment generated by the elastic constraint along the pivot axis 34 or output axis 4, whereas the couple of the force components 38 and 41 in the direction of the pivot axis would be resisted by the elastic rigidity of the ribbons in the ribbon plane and finally the couple of the force components 40 and 43 in the direction of the mass axis simply balance against each other and produce no moment.

This system can also resist strong angular acceleration applied about the input axis because of the rigidity of the ribbon system in that direction. Any angular acceleration applied to the pivot axis means error due to the pendulicity effect (non pendulous accelerometer will not have this problem) of this instrument. Likewise this system can only resist somewhat milder angular acceleration applied about the mass axis because the angular rigidity provided by the coplanar ribbon suspension system in that direction is weaker than that about the input axis. However, strong steady state angular acceleration usually does not exist in this type of application as dictated by the condition described earlier for angular acceleration applied to the pivot axis. High frequency angular acceleration usually presents little problem because of the damping effect of a floated instrument.

Figure 11:
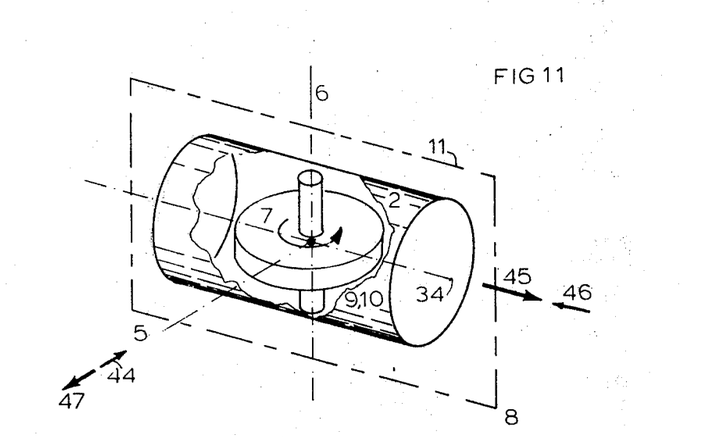
FIG. 11 Vector components of a floated gyro with coplanar ribbon suspension system.

FIG. 11 shows the adaptation of a coplanar ribbon suspension system to a floated single degree of freedom gyroscope similar to FIG. 5. The ribbon plane 11 representing the suspension system of FIG. 6 or 9 with pivot axis 34 is used to replace pivot 3 of FIG. 5. Since the float 2 is designed to place the C.G. 10 coincident with C.B. 9 this instrument is completely insensitive to linear acceleration. The problem about any angular acceleration may be answered by the same line of reasoning applied to the floated linear accelerometer as described before.

As for the angular rate applied to the three axis of FIG. 11 the situation is as follows angular rate 44 applied to the input axis 5 demands a reaction torque 45 at the pivot axis 34 and will be provided by the inherent elastic restraining properties along the pivot axis of the instrument; angular rate applied to the spin axis 6 produce a very small negligible change in the system sensitivity; angular rate 46 applied to the pivot axis demands a reaction torque 47 in the input axis 5 which is to be provided by the elastic regidity of the ribbons 14, 15, 16 and 17 in the ribbon plane 11 of FIG. 6 and represented in FIG. 11 by the rectangular block 11 normal to the input axis 5.

ZERO STIFFNESS TAUT RIBBON ROTARY SUSPENSION SYSTEM

General speaking, an ideal rotary suspension system must have a very low uncertainty and preferably low rigidity along its pivot axis and have high rigidity in all other possible degrees of freedom. Since a coplanar taut ribbon rotary suspension system as shown in FIG. 6 can provide high rigidity only in directions within the ribbon plane but is considerably weaker in the direction normal to the ribbon plane, it is logical therefore to introduce a second set of ribbons stretched in a second ribbon plane generally orthogonal with the first ribbon plane to provide adequate rigidity in all directions. The intersection of these two ribbon planes defines the pivot axis which in turn specifies the arrangement of the associating rods, ribbons, ribbon anchorages and tension springs in the same manner as described earlier for the coplanar taut ribbon suspension systems.

Figure 12:
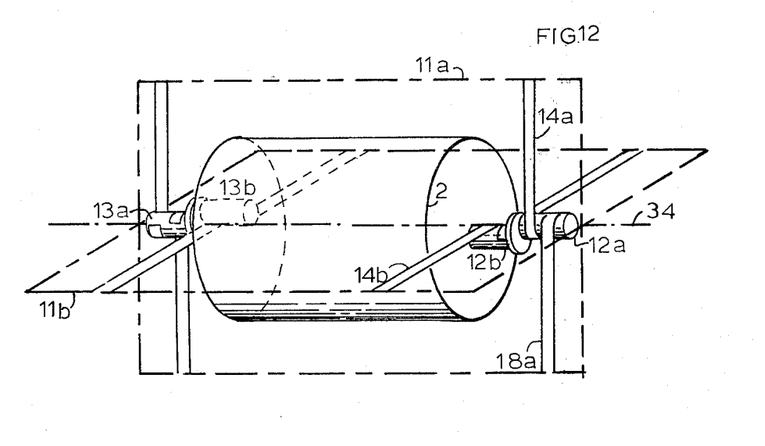
FIG. 12 A rotary suspension system with two ribbon plane in orthogonal arrangement.

A typical configuration with four sets of coplanar ribbons —two sets at each end—is shown in FIG. 12. A typical set consists of two ribbons 14a and 18a Each ribbon is wrapped over a segment of the rod 12a which is attached to the suspended member 2. The lines where the ribbons 14a and 18a depart from the rod segment 12a coincide with the pivot axis 34 of the system. This same condition holds true for the other three sets of ribbons and rod segments. The ribbons are stretched tightly across some suitable anchorage edges provided on the instrument case in the same manner as shown in FIG. 6. In a preferred arrangement one ribbon is attached to the instrument case rigidly while the other ribbon is stretched by a spring to impart a nearly constant force in a direction along the ribbon plane also as shown in FIG. 6 and FIG. 9.

In a preferred form, the four sets of ribbons should be arranged essentially along two orthogonal planes 11a and 11b intersecting at the pivot axis 34. It also might be desirable from the consideration of secondary effects to arrange the rigidly anchored ribbons at opposite ends of the instrument in a diagonal symmetircal manner as shown in FIG. 12.

As discussed earlier, in its ideal condition, a coplanar ribbon system offers no rotary stiffness about the pivot axis near the neutral condition. However, due to imperfection in holding the dimension of the parts, such as the alignment of the rods, their roundness, and surface condition, there could be some residue stiffness for each coplanar ribbon suspension system. However, with four sets of the ribbons, it is possible to make adjustment of the torsional stiffness along the pivot axis 34 from a positive spring effect to a negative spring effect including a zone with zero stiffness by changing the angle between the ribbons.

Figure 13:
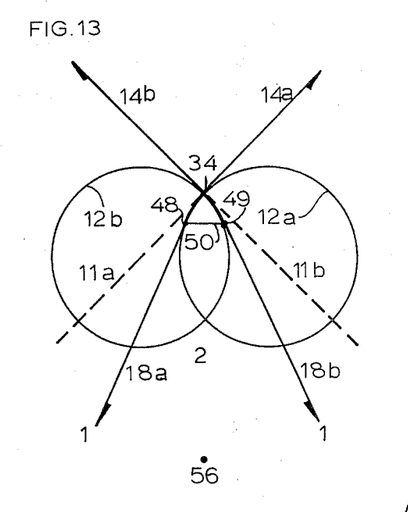
FIG. 13 Ribbon position to give positive spring effect.
Figure 14:
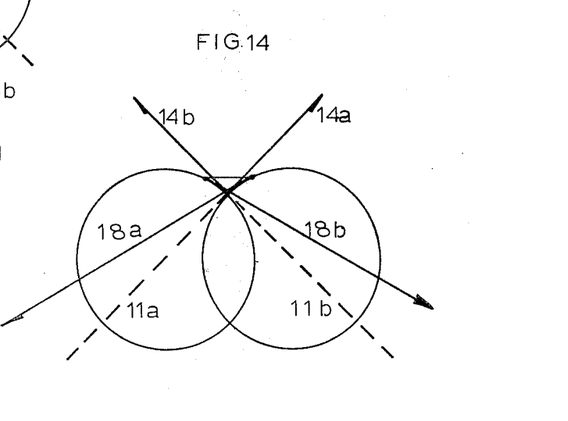
FIG. 14 Ribbon position to give negative spring effect.

FIG. 13 and FIG. 14 illustrate the effect on the torsional stiffness of the system due to the changing of the angle between one pair of the ribbons by moving them away from their respective ribbon planes which is tangential to the corresponding segment at the pivot axis.

FIG. 13 shows the end view of a ribbon suspension system with two rod segments 12a and 12b orthogonally aligned with each other and parallel to the pivot axis which is identified as point 34. Ribbons 14a and 14b are shown in their normal condition, by staying in their respective ribbon planes 11a and 11b and intersecting the pivot axis 34. Ribbons 18a and 18b are shown to have a small angle with their respective ribbon planes as represented by the dotted lines 11a and 11b extendng from ribbons 14a and 14b so that their separation is less than 90°. As a result, ribbon 18a intersects rod 12a at point 48, while ribbon 18b intersects rod 12b at point 49. Points 48 and 49 may be considered as the instantaneous rotation centers between ribbons 18a and 18b with the suspended member 2. Thus, ribbons 18a and 18b, the suspended member 2 upon which rod segments 12a and 12b are attached, and the instrument case 1 now form an instantaneous four-bar-linkage. Point 50 is the center between point 48 and 49. It should have traveled as an arc with its instantaneous center 56 at a far distance toward the lower side of the picture of FIG. 13. The equivalent system now becomes a two-bar-linkage represented by line segments 34–50 and 50–56. This two-bar-linkage is under tension between the two ends 34 and 56 because this equivalent structure is simulated from the ribbon system which represents the rigid body of the suspended member 2 hinged at the pivot axis 34. When this line segment 34–50 is rotated about the pivot axis 34 a force component would be generated by the tension along line segment 50–36 with a tendency to resist the angular displacement. The net result is therefore a positive stiffness for the suspension system.

FIG. 14 is arranged to have the two lower ribbons 18a and 18b spread out to be larger than 90° as defined by the orthogonality of their ribbon plane 11a and 11b. By going through with the same development discussed above for FIG. 13, it is obvious that the condition of FIG. 14 results in a negative spring for the suspension system.

In a pilot model of a zero stiffness rotary suspension system with a one inch diameter instrument case, a one-eighth inch rod diameter and 0.0005 thick ribbon, it was possible to adjust the ribbon angles to change the torsional stiffness of the system from positive to negative and to achieve a zone with nearly zero stiffness over 4° of total angular swing of the suspended member. The pilot model was not made by precision instrument standard and the provision for angular adjustment was quite crude also. However, the test result was very encouraging with the resolution down to a very low level of torque. (About .001 dyne-cm).

One advantage of this rotary suspension system is the ease of making adjustment because it allows for a sizeable change of ribbon angle to effect a small change in torsional stiffness. The second advantage of this type of suspension system is that its low stiffness comes from its natural geometrical property and not from taking the difference of a large positive stiffness and to be balanced by an equally large negative stiffness.

TWO AXES ZERO STIFFNESS TAUT RIBBON SUSPENSION SYSTEM

Figure 15:
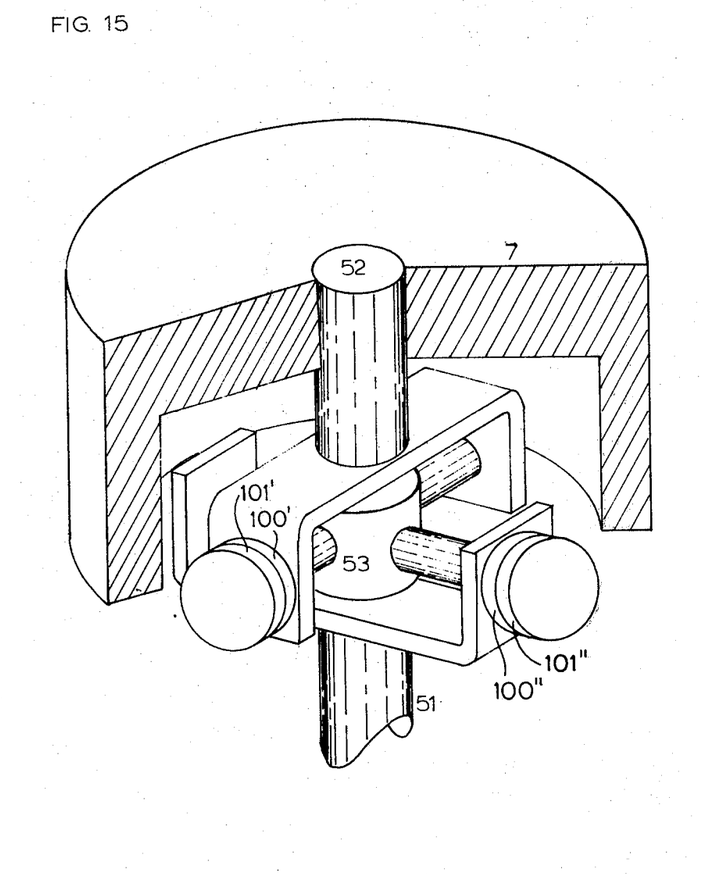
FIG. 15 A two degree of freedom gyro mounted on a universal joint as the inner gimble.

A two axes suspension system is essentially a universal joint. For instrument application a frictionless universal joint would be ideal for the design of a two degree of freedom gyro as shown in FIG. 15 or a two degree of freedom angular or pendulous accelerometer. In some 2° of freedom gyros, flexures are used in place of the pivots 53 shown in FIG. 15. See for example "The Dynamically Tuned Free Rotor Gyro" by Edwin W. Howe and Paul H. Savet in the June 1964 issue of Control Engineering. The stiffness of the flexure produces undesirable precession motion of the gyro. One solution of this problem is to utilize the dynamic effect of the inner gimble 53 (the cross-shaped pivot structure of the universal joint) to counteract against the stiffness of the flexure. One major difficulty of this scheme is the resonance phenomena associated with this system which tends to cause fatigue failure of the flexures. The other difficulty arrives from the need of a balance between two entirely different physical properties which are affected differently by the speed of rotation, temperature variations, etc. Because two degree of freedom gyros do have their attractions, it is therefore desirable to have a universal joint comprised of two zero stiffness rotary hinges such as the taut ribbon suspension system herein described.

Figure 16:
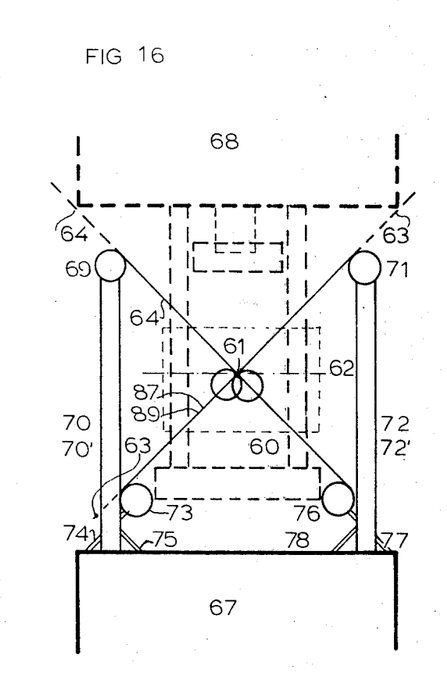
FIG. 16 First side view of freedom taut ribbon rotary suspension system.
Figure 17:
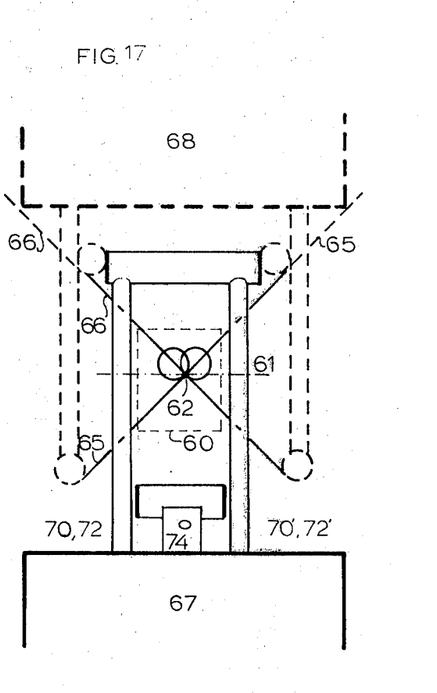
FIG. 17 Second side view perpendicular to the first side view of FIG. 16.
Figure 19:
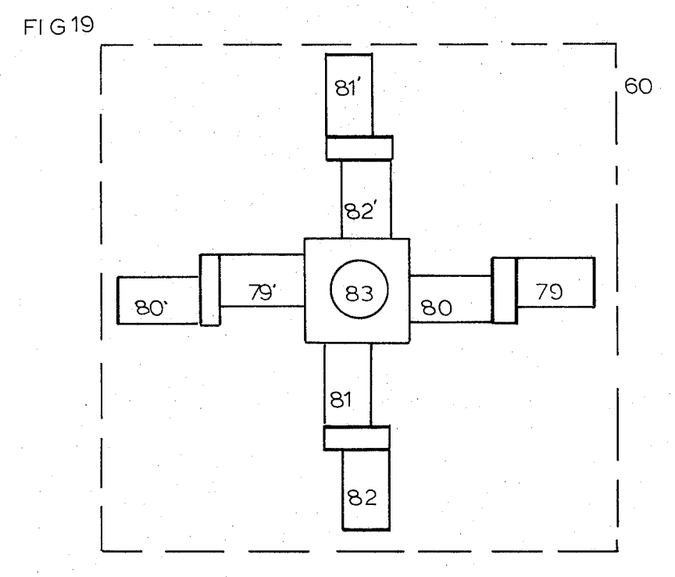
FIG. 19 Intermediate element of FIG. 16.
Figure 20:
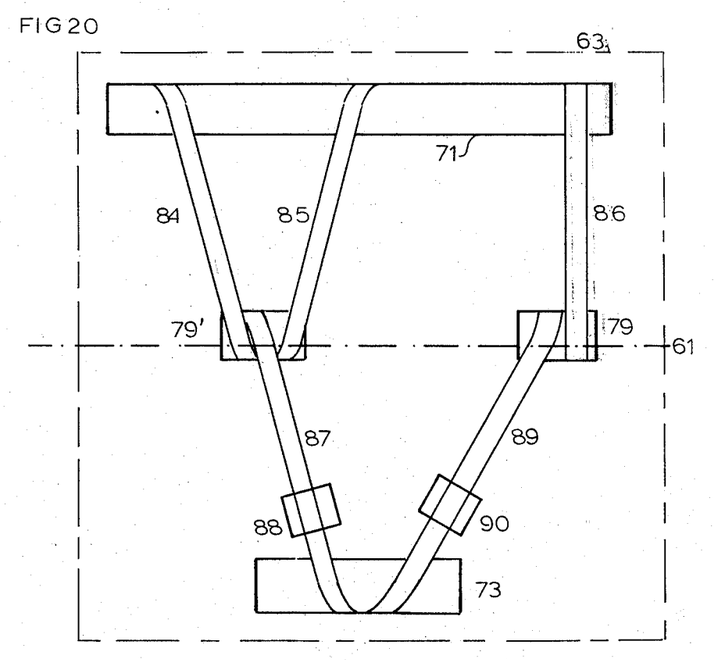
FIG. 20 Layout of ribbon in one of the four ribbon planes of FIG. 16.

FIG. 16 and 17 illustrates the two views of a basic layout of a two degree of freedom taut ribbon suspension system. 67 and 68 are identified as the first and second members corresponding to the two shafts 51 and 52 of FIG. 15. The two pivot axes are specified as lines 61 and 62, where 61 is the axis between the cross form intermediate member 60 and the first member 67, 62 is the axis between the said intermediate member and the second member 68. The detail layout of the intermediate member 60 carrying the rod segments 79, 80, 81, and 82 is shown in FIG. 19. Two single axis ribbon suspension systems represented by four ribbon planes 63, 64, 65, and 66 are used to accomplish the hinged suspension. The detail layout of the associating elements to go with ribbon plane 63 is shown in FIG. 20. Similar configuration applies to the other three ribbon planes 64, 65, and 66.

Figure 18:
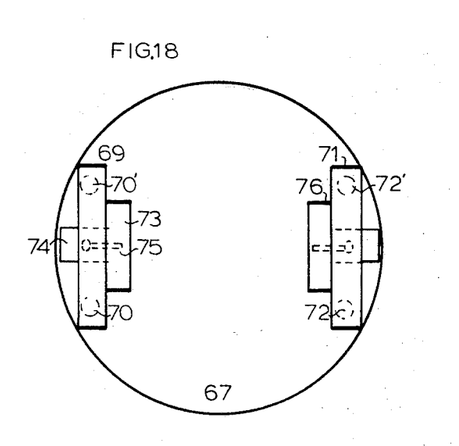
FIG. 18 End view of FIG. 16.

FIG. 18 shows the end view of member 67 with the ribbon anchoring rods but no ribbons.

FIG. 16 shows that the ribbons of ribbon plane 63 of the upper side of the pivot axis 61 are anchored rigidly to the straight bar 71 which is attached to the first member 67 by posts 72 and 72'. The lower side of the ribbon plane 63 carries the tension ribbons 87 and 89 which are anchored to the straight bar 73 which is anchored to the first member 67 by a flat plate 74 and is adjustable by screw 75. All these five ribbons are attached to the rod segments 79 and 79' of the intermediate member shown in FIG. 19 and 20.

Figure 24:
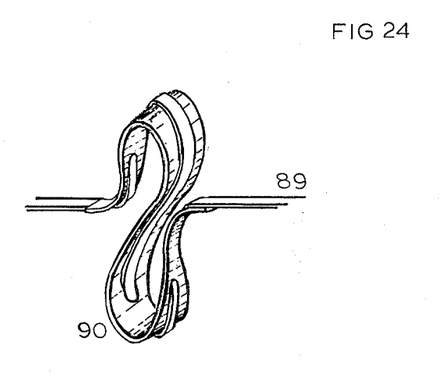
FIG. 24 Typical floating spring design.

FIG. 20 shows the layout of the ribbons in ribbons plane 63. Ribbons 84, 85, and 86 represent the fixed anchored ribbons which are arranged like a truss to provide for the rigidity between the intermediate member and the first member along all directions in ribbon plane 63. Ribbons 87 and 89 are tension ribbons, their tension is provided by springs 88 and 90, as shown in FIG. 24. All these five ribbons described above are attached to the anchoring bars 71 and 73 and rod segments 79 and 79'.

The ribbon layout of FIG. 20 for ribbon plane 63 applied equally well for ribbon planes 64, 65, and 66.

A two degree of freedom taut ribbon suspension system as shown in FIG. 16 may be used to replace the universal joint of the two degree of freedom gyro as shown in FIG. 15. However to achieve perfect balancing it is necessary to tune the intermediate member as shown in FIG. 19 for zero dynamic effect which can be done by equating:

$$C = a + b$$

where $C$ = moment of momentum of the intermediate member about the spin axis:

$a$ - $b$ - moment of momentum about the two rotary axes.

As typical example, this condition is met perfectly by a thin circular disc, or a simple cross.

The intermediate member as shown in FIG. 19 appears to satisfy the desired condition without additional modification.

LATERAL DISPLACEMENT OF THE ZERO STIFFNESS TAUT RIBBON SUSPENSION SYSTEM

Figure 21:
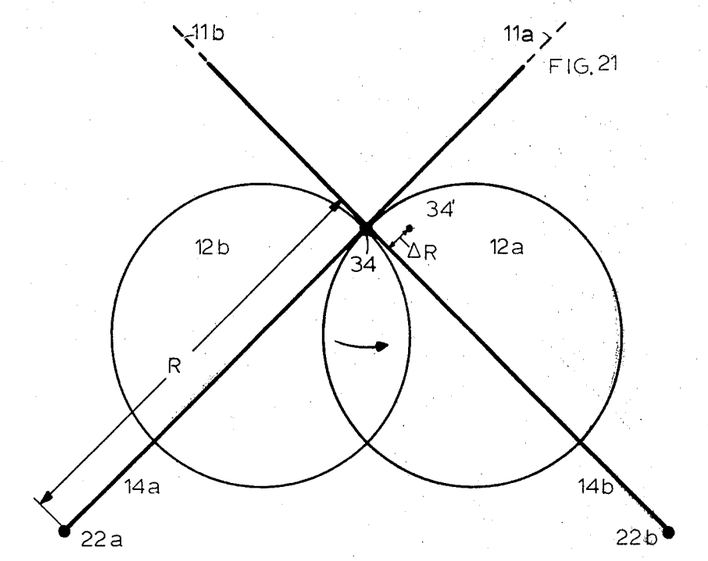
FIG. 21 The displacement of the pivot axis as function of rotation with two ribbons in diagonal arrangement.

FIG. 21 illustrates the lateral displacement of the pivot axis shifting from point 34 to 34' of the zero stiffness rotary suspension system as the system rotates. The general shape of the locus for a swing up to ±15° of the suspended member is very close to a straight line bisecting the two orthogonal ribbon planes 11a and 11b and cuts across the two rods 12a and 12b. The location of the pivot axis is primarily determined by the length R of the ribbons 14a and 14b which are anchored at their outer ends to the instrument case at point 22a and 22b. In the configuration of FIG. 21 the lateral displacement is approximately equal to $\sqrt{2} \times \Delta R$ because in this arrangement the distance between the new position of the pivot axis 34' is further away from anchor point 22a by a distance $\Delta R$ while moving closer to anchor point 22b by approximately the same amount.

By using this reasoning it can be found that the locus of point 34 remains to be approximately the same shape no matter which pair of the four ends of the ribbons are used as fixed anchorage.

Figure 22:
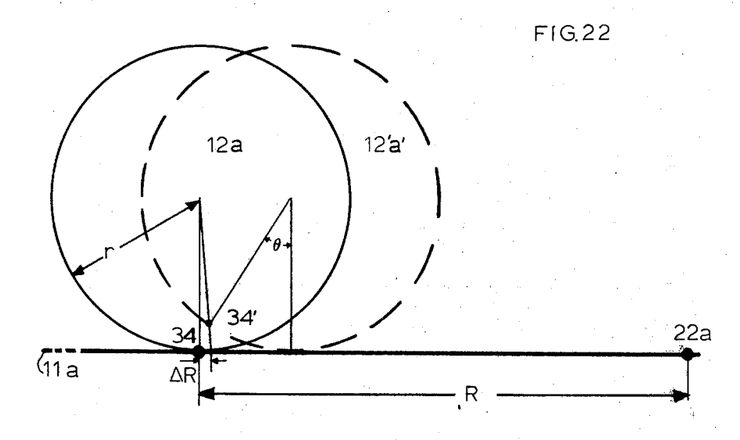
FIG. 22 Geometry for determining effective lengths of ribbons.

FIG. 22 shows the locus of the pivot axis 34 as function of angle of rotation of the rod with respect to the ribbon plane. The exact increment $\Delta R$ is $\Delta R = R - \sqrt{(R - r(\theta - \sin\theta))^2 + r^2(1 - \cos\theta)^2}$ where $R$ is the normal length of the ribbon
$r$ is the radius of the rod
Typical value of R is about 10r.

For $\theta$ less than 10° in both directions or for very large R the average value of $\Delta R$ for both sides of rotation can be simplified to $\Delta R = \pm r(\theta - \sin\theta)$ For example, with $\theta = \pm 2°$
and $r = .06$ inch
$\Delta R = \pm .000000425$ inch
and the shifting of the pivot axis from point 34 to 34' is only about $1.4 R = 6 \times 10^{-7}$ inches For practical instrument the pivot axis may only rotate .1° and the corresponding lateral shift is certainly insignificant.

CONSTRUCTION AND UNCERTAINTIES OF THE TAUT RIBBON SUSPENSION SYSTEMS

In principle, ball or jowel bearings are zero stiffness suspension systems with unlimited angle of rotation. A taut ribbon rotary suspension system has limited range of angle of rotation but has the advantage in its relatively low torque uncertaintities.

Material selection and surface treatment are essential with the design and fabrication of a ball bearing. Similar considerations must be given to the construction of the rods, ribbon, anchors and spring of the taut ribbon rotary suspension system. Some obvious considerations are listed as follows:

The Rod:

The surface of the rod should be cylindrical with substantial straight line segments so that the ribbon can wrap over it with the shape of the rod conforming with the ribbon in its minimum potential energy change bending mode so that the stiffness, uncertainty, and friction are reduced to minimum.

The effective outer line of the bearing surface of the rod for all ribbons in one ribbon plane should be colinear to avoid binding effect in an analogy to what would happen to a warped piano cover with the long hinges. An offset of the effective center line of the bearing surface of the rod segment for the anchoring ribbons from the effective center line of the bearing surface for the spring loaded ribbons would produce zero offset as well as a positive spring or negative spring effect. Except for the bearing surface of the rod in the vicinity of the pivot axis where the geometry of the ribbon is defined, the shape of the rod at other places may be altered to fit with the space requirement and the structure rigidity.

A hard bearing surface with a fine finish should in general be preferable, Tunstun carbide, Cynide or nitric surface treatment of steel, saphire or quartz are all possible material. A thin film coating with oxide or teflon may provide lower contact friction and avoid microscopic welding with the ribbons material.

The Ribbon:

In principle, the ribbon material should have very low internal loss. Typical material is Elgilory, developed for watch springs. Material with high tensile strength and modulus of elastisity is preferable because it allows the use of thinner material while maintaining higher lateral rigidity. High surface finish and free from dents, wrinkles, and edge imperfections are routine requirements of ribbons for similar kinds of application.

The shape of the ribbon may be etched from flat sheet especially when truss-like arrangement is used. The potential energy involved in wrapping the ribbons over the two sides of the rod should be substantially equal.

Method of attaching ribbons to the rod:

The ribbons may be stitch welded or clamped to the rod. The length between the attaching point and the point of departure of the ribbons and the rod should be slightly longer than needed for freedom of motion.

Anchoring of the ribbon to the instrument case:

The fixed end anchoring method should follow the same practice as that used for the ribbon and the rod on the suspended member even though it is much less critical being further away from the center so that the relative motion between the ribbon and its support is much less.

Figure 23:
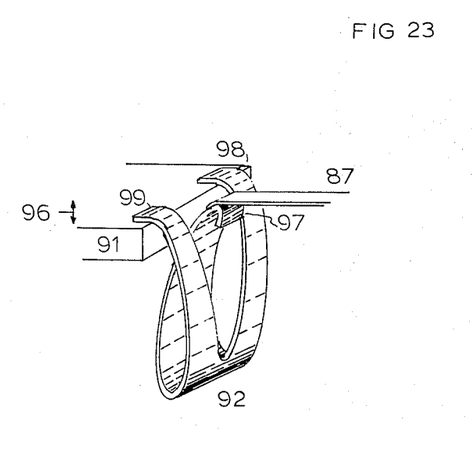
FIG. 23 A typical spring design to anchor the ribbon.

The Spring:

When the system is adjusted to realize some positive spring or negative spring effect or to use the stiffness of one side of the ribbon to balance against that of the other side, the energy thus involved essentially comes from the spring. For this reason the spring should be designed to have very little energy loss. One typical spring design is shown in FIG. 23. The spring 92 is made of sheet stock. When the stock is bended over and assembled, the three fingers 97, 98 and 99 would be placed in the ribbon plane with the ribbon attached to finger 97 and with finger 98 and 99 attached to the bracket 91 which is anchored to the instrument case with provision for making adjustment in the direction as shown by the double arrow 96 normal to the ribbon plane.

FIG. 24 illustrates a "floated" spring design. In the isometric view ribbon 89 is shown to be threaded through the spring 90 so that they become one single elastic tension member and can be stretched between the suspended member and a fixed anchor on the instrument case. In this manner the lateral rigidity of the spring is no longer a crucial matter.

In both spring configurations of FIG. 23 and 24, the shape of the spring should be designed with uniform stress and minimum stress concentration to minimize hysteresis effect.

Some logic to justify the claim that the taut ribbon-on-rod suspension system may have low uncertainties than ball bearings.

Figure 25:
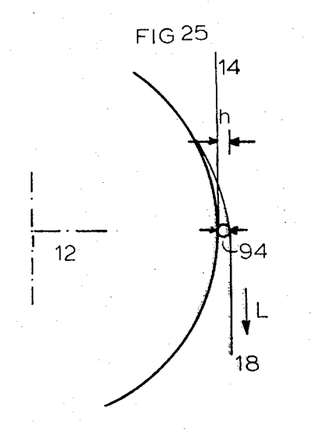
FIG. 25 Illustration of a ribbon over a protrusion on rods.
Figure 26:
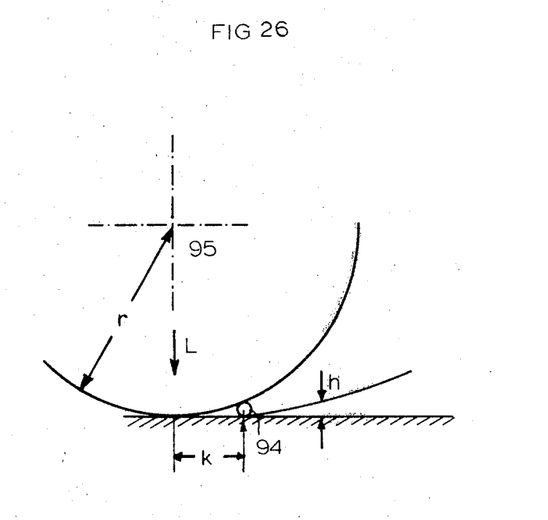
FIG. 26 Illustration of a ball over a protrusion on the race.

FIG. 25 shows an enlarged view of the ribbon 18 over the rod 12 as compared with an enlarged view of a ball-on-race of FIG. 26. Assuming that in both cases that a small protrusion 94 is attached to the surface with a height of "$h$" and that the loading is L then for the ribbon situation there is a displacement of "$h$" of one ribbon from the other end and as a result there is an uncertainty of torque equal to
$$\Delta T = L \times h$$
In the situation of the ball bearing a protrusion with the height of h the reaction force would shift over to where the protrusion is with an uncertainty torque of $\Delta T = L \times k$ where "$k$" is the distance of the protrusion from the tangent point of the roller with the race in the normal condition. Using simple geometry we have $k = \sqrt{rh}$ where "$r$" = radius of the ball, as an example if "$r$" = 1,000,000 $h$ for precision ball bearing then "$k$" = 1000 h and the uncertainty torque for the ball bearing is $\Delta T = 1000\, L \times h$ which is one thousand times larger than the uncertainty for the ribbon over rod situation.

Figure 27:
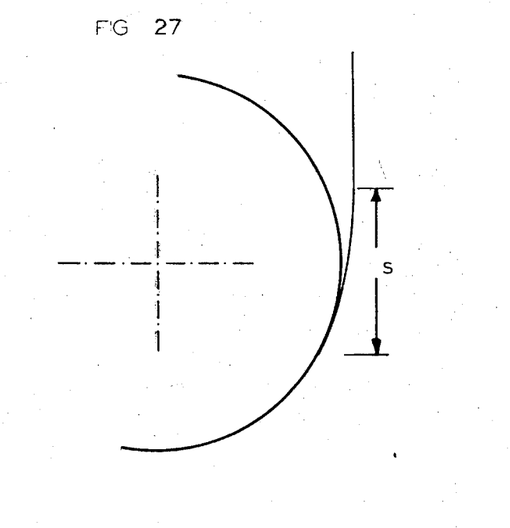
FIG. 27 Illustration of the transition section of a ribbon over a rod.

FIG. 27 shows that it takes a length "$s$" which is many times of the thickness of the ribbon "$t$" to complete the transformation from a straight ribbon into a curved one conforming with the surface of the rod. It is worth noting that over this length "$s$" the ribbon assumes a curvature larger than that of the surface of the rod and hence does not make any contact with the rod. During this section there is the progressive change of bending stress and strain which could produce contact friction with the rod if it is allowed to make the contact. But since it is not in contact with the rod during this section, this problem of stress induced friction becomes insignificant.

In the case of the ball-on-race configuration, the ball must deflect to conform with the race to develop any bearing area to carry the load. This deformation involves a change in the double curvature which means significant amount of surface rubbing and therefore friction loss. The familiar phenomenon of a steel belted radial tire having lower tire wear and friction as compared with conventional tire can be used here as an analogy.

In conclusion, from a theoretical point of view, a ribbon-rod configuration should have lower uncertainty as compared with that of a ball bearing if both are made with equal quality in material and surface condition.

Having thus described my invention, I claim:

1. A rotary suspension system comprised of a first member, a second member, a pivot axis representing the desirable rotary mode of freedom of the second member with respect to the first member, at least one ribbon plane containing the pivot axis, at least one set of straight rod segments attached to the said second member and tangent to each ribbon plane along the pivot axis, a set of ribbons for each rod segment each with one end attached to and wrapped around over the said rod segment for a small arc and then departing from the rod at the pivot axis to fan out along the said ribbon plane in various directions with respect to the pivot axis; all ribbons being stretched and attached to the first member at the outer ends of the said ribbons while remaining within the associated ribbon plane whereby said second member is supported for rotation about the pivot axis for rotation with minimum uncertainty.

2. A rotary suspension system as set forth in claim 1 wherein each ribbon plane is divided into first and second groups of ribbons, one group on each side of the pivot axis; the first group of ribbons anchored rigidly to said first member; and the second group of ribbons anchored to the first member elastically by springs to provide specified tension to each ribbon.

3. A rotary suspension system as set forth in claim 2 wherein two of said rod segments are employed for each ribbon plane, one located at each end of the said second member along the pivot axis; each rod segment having at least two ribbons under tension to secure the second member to the first member.

4. A rotary suspension system as set forth in claim 3 wherein the two rod segments at the two ends of the second member are located at opposite sides of the same ribbon plane.

5. A rotary suspension system as set forth in claim 4 having two ribbon planes orthogonal to each other and intersecting at said pivot axis.

6. A rotary suspension system as set forth in claim 5; said orthogonal ribbon planes defining quadrants, at least two of said ribbons, one in each of adjacent quadrants being adjustable at their anchorages to the first member in a direction normal to the respective ribbon planes.

7. A rotary suspension system according to claim 6 wherein said suspension system provides a gyroscope pivoted about the pivot axis of the suspension system, a sensor for sensing angular motion of said gyro about said pivot axis, a torquer for applying torques to said gyro with respect to said pivot axis, said pivot axis being normal to the spin axis of the gyro wheel, whereby said gyro is adapted to function as a single degree of freedom gyro.

8. A suspension system according to claim 6 wherein said suspension serves to provide the pivot axis for a suspended seismic mass, the center of gravity of the effective mass being displaced from said pivot axis, an angular sensor to sense motion of said suspended mass with respect to said pivot axis, a torquer to apply torque to said suspended mass with respect to said pivot axis, whereby said suspended seismic mass functions as a pendulous accelerometer.

9. A suspension system according to claim 6 wherein said pivot axis serves as the axis of rotation of a floated seismic mass, said seismic mass having its center of buoyancy on the axis of rotation and its center of mass displaced from said center of buoyancy, the center of buoyancy and the center of gravity serving to define a mass axis, said mass axis being normal to the pivot axis, an angular sensor to sense rotary motion of said floated seismic mass about said pivot axis, a torquer to apply torque to said floated mass with respect to said pivot axis, whereby said floated seismic mass is adapted to function as a pendulous accelerometer.

10. A rotary suspension system according to claim 6 wherein said pivot axis serves as the pivot axis for a gyro, a torsional bar to restrain motion of said gyro about said pivot axis, an angular sensor to sense rotary motion of said gyro with respect to said pivot axis, whereby the sensing of rotary motion of said gyro with respect to said pivot axis serves to provide a single degree of freedom rate gyro.

11. A suspension system according to claim 6 wherein said second member serves as a rotary mass, an angular sensor for sensing rotary motion of said second member with respect to said pivot axis, a torquer for applying torque to said second member with respect to said pivot axis, the center of gravity of said rotary mass lying on said pivot axis, whereby the sensing of rotary motion of said rotary mass with respect to said pivot axis serves to provide a single axis angular accelerometer.

12. A rotary suspension system according to claim 1 wherein said suspension system provides a gyroscope pivoted about the pivot axis of the suspension system, a sensor for sensing angular motion of said gyro about said pivot axis, a torquer for applying torques to said gyro with respect to said pivot axis, said pivot axis being normal to the spin axis of the gyro wheel, whereby said gyro is adapted to function as a single degree of freedom gyro.

13. A suspension system according to claim 1 wherein said suspension serves to provide the pivot axis for a suspended seismic mass, the center of gravity of the effective mass being displaced from said pivot axis, an angular sensor to sense motion of said suspended mass with respect to said pivot axis, a torquer to apply torque to said suspended mass with respect to said pivot axis, whereby said suspended seismic mass functions as a pendulous accelerometer.

14. A suspension system according to claim 1 wherein said pivot axis serves as the axis of rotation of a floated seismic mass, said seismic mass having its center of buoyancy on the axis of rotation and its center of mass displaced from said center of buoyancy, the center of buoyancy and the center of gravity serving to define a mass axis, said mass axis being normal to the pivot axis, an angular sensor to sense rotary motion of said floated seismic mass about said pivot axis, a torquer to apply torque to said floated mass with respect to said pivot axis, whereby said floated seismic mass is adapted to function as a pendulous accelerometer.

15. A rotary suspension system according to claim 1 wherein said pivot axis serves as the pivot axis for a gyro, an angular sensor for sensing rotary motion of said gyro about said pivot axis, said adjustable ribbon anchorages being adjusted to give the desired torsional stiffness about said pivot axis whereby the sensing of rotary motion of said gyro with respect to said pivot axis provides a single degree of freedom rate gyro.

16. A suspension system according to claim 1 wherein said second member serves as a rotary mass, an angular sensor for sensing rotary motion of said second member with respect to said pivot axis, a torquer for applying torque to said second member with respect to said pivot axis, the center of gravity of said rotary mass lying on said pivot axis, whereby the sensing of rotary motion of said rotary mass with respect to said pivot axis serves to provide a single axis angular accelerometer.

17. A two-degree of freedom rotary suspension system comprising a first member, a second member, an intermediate member, a first pivot axis representing the desirable rotary mode of freedom of the intermediate member with respect to the first member, a second pivot axis representing the desirable rotary mode of freedom of the intermediate member with respect to the second member, said first and second pivot axes being orthogonal, at least one ribbon plane containing each pivot axis, said ribbon planes serving to provide a rotary suspension of said first member with respect to the intermediate member about the first pivot axis and a rotary suspension about said second pivot axis of the intermediate member with respect to the second member.

18. A two-degree of freedom suspension system according to claim 17 comprising a gyro wheel coupled to the first member of said system, a drive shaft coupled to the second member of said system, said intermediate member having moments of momentum about the spin axis of said gyro wheel and about said first and second pivot axes, the moment of momentum of the intermediate member about the spin axis equaling the sum of its moments of momentum about said first and second pivot axes, first and second angular sensors for sensing rotary motion of said intermediate member about said first and second axes, first and second torquers for applying torque to said intermediate member with respect to said first and second pivot axes, said first and second pivot axes being substantially in one plane normal to the spin axis of said gyro wheel, whereby said gyro wheel is adapted to function as a two-degree of freedom gyro.

19. A suspension system according to claim 17 having first and second angular sensors for said first and second pivot axes to sense rotary motion of said intermediate member with respect to said first and second pivot axes, first and second torquers to apply torque to said intermediate member with respect to said first and second axes, said first and second torquers being adapted to apply the torque necessary to null the rotary motion with respect to said first and second pivot axes detected by said first and second angular sensors, a seismic mass coupled to said first member, and means responsive to the first and second torque inputs provided by said first and second torquers to provide a two-degree of freedom pendlous accelerometer.

20. A suspension system according to claim 17 comprising first and second pivot axes lying in the same plane, a seismic mass having its center of gravity at the intersection of said first and second pivot axes, first and second angular sensors for sensing rotary motion of said intermediate member about said first and second pivot axes, first and second torquers for applying torque to said intermediate member with respect to said first and second axes, and means responsive to said first and second torques to provide a two axis angular accelerometer.

* * * * *

UNITED STATES PATENT AND TRADEMARK OFFICE
CERTIFICATE OF CORRECTION

PATENT NO. : 4,000,659
DATED : January 4, 1977
INVENTOR(S) : Yao Tzu Li

It is certified that error appears in the above-identified patent and that said Letters Patent are hereby corrected as shown below:

Column 10, line 3, change "outer" to --center--.

Signed and Sealed this

Third Day of May 1977

[SEAL]

Attest:

RUTH C. MASON
*Attesting Officer*

C. MARSHALL DANN
*Commissioner of Patents and Trademarks*